(12) United States Patent
Park et al.

(10) Patent No.: US 10,108,050 B2
(45) Date of Patent: *Oct. 23, 2018

(54) PHOTOALIGNMENT AGENT, LIQUID CRYSTAL DISPLAY DEVICE INCLUDING THE SAME, AND METHOD OF MANUFACTURING THE SAME

(71) Applicant: Samsung Display Co., Ltd., Yongin, Gyeonggi-Do (KR)

(72) Inventors: Yeong Rong Park, Suwon-si (KR); Suk Hoon Kang, Seoul (KR); Mi Hwa Lee, Seoul (KR); Baek Kyun Jeon, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 545 days.

This patent is subject to a terminal disclaimer.

(21) Appl. No.: 14/479,579

(22) Filed: Sep. 8, 2014

(65) Prior Publication Data

US 2015/0241739 A1    Aug. 27, 2015

(30) Foreign Application Priority Data

Feb. 26, 2014    (KR) ........................ 10-2014-0022617

(51) Int. Cl.
*G02F 1/13*      (2006.01)
*G02F 1/1337*    (2006.01)
*C08G 73/16*     (2006.01)
*C09D 179/08*    (2006.01)
*C08G 73/10*     (2006.01)
*G02F 1/1333*    (2006.01)
*G02F 1/1343*    (2006.01)

(52) U.S. Cl.
CPC ... *G02F 1/133788* (2013.01); *C08G 73/1078* (2013.01); *C08G 73/16* (2013.01); *C09D 179/08* (2013.01); *G02F 1/133345* (2013.01); *G02F 2001/134372* (2013.01)

(58) Field of Classification Search
CPC .... G08G 73/16; G08G 73/1078; C09K 19/56; G02F 1/133788
See application file for complete search history.

(56) References Cited

U.S. PATENT DOCUMENTS 6,063,829 A    5/2000   Endou et al.
6,090,909 A    7/2000   Kato et al.
(Continued)

FOREIGN PATENT DOCUMENTS

CN    1727364 A  *  2/2006
JP    4884027 B2    12/2011
(Continued)

OTHER PUBLICATIONS

Coppinger et al., "Photo-Fries Rearrangement of Aromatic Esters. Role of Steric and Electronic Factors", The Journal of Physical Chemistry, vol. 70, No. 11, Nov. 1966, pp. 3479-3489.

*Primary Examiner* — Chanceity N Robinson
(74) *Attorney, Agent, or Firm* — Cantor Colburn LLP

(57) ABSTRACT

A photoalignment agent is provided. The photoalignment agent includes a copolymer of at least one of a cyclobutanedianhydride (CBDA) and a cyclobutanedianhydride (CBDA) derivative, and a realignment property diamine, wherein two or more aromatic rings in the realignment property diamine are connected by an ester group.

18 Claims, 6 Drawing Sheets

(56) References Cited

U.S. PATENT DOCUMENTS

| | | | |
|---|---|---|---|
| 6,274,695 B1 * | 8/2001 | Endou | G02F 1/133711 |
| | | | 428/1.2 |
| 8,497,002 B2 | 7/2013 | Matsui et al. | |
| 2011/0221984 A1 | 9/2011 | Matsumori et al. | |
| 2015/0085237 A1 * | 3/2015 | Kang | G02F 1/133788 |
| | | | 349/127 |
| 2015/0240032 A1 * | 8/2015 | Kang | C08G 73/1042 |
| | | | 349/123 |
| 2015/0243229 A1 * | 8/2015 | Jung | G09G 3/3688 |
| | | | 345/690 |

FOREIGN PATENT DOCUMENTS

| | | | |
|---|---|---|---|
| JP | 2012068612 A | * | 4/2012 |
| KR | 100459491 B1 | | 11/2004 |
| KR | 1020080090680 A | | 10/2008 |

* cited by examiner

PHOTOALIGNMENT AGENT, LIQUID CRYSTAL DISPLAY DEVICE INCLUDING THE SAME, AND METHOD OF MANUFACTURING THE SAME

This application claims priority to Korean Patent Application No. 10-2014-0022617 filed on Feb. 26, 2014, and all the benefits accruing therefrom under 35 U.S.C. § 119, the contents of which in its entirety are herein incorporated by reference.

BACKGROUND (a) Field

The present invention relates a photoalignment agent, a liquid crystal display including the same, and a manufacturing method thereof.

(b) Description of the Related Art

In a liquid crystal element, to display images, that is, to switch liquid crystals between transparent conductive glass through an external electrical field, the liquid crystals are typically aligned in a predetermined direction in the interface between the liquid crystal alignment layer and the transparent conductive glass. The degree of uniformity of the liquid crystal alignment layer is an important factor for determining the display quality of the liquid crystal display.

In the conventional method of aligning the liquid crystals, a rubbing method may be used where a polymer layer such as a polyimide is coated on a substrate such as glass and the surface is rubbed in a predetermined direction by using a fiber material such as nylon or polyester. However, minute particles or an electrostatic discharge ("ESD") may be generated when the fiber material and the polymer layer are rubbed against each other, and may cause a serious problem during the manufacturing of the liquid crystal display panel.

To solve this problem, a photoalignment method where anisotropy is provided to the polymer layer by light irradiation to align the liquid crystals has been researched. Particularly, a method to improve an afterimage in the method aligning the liquid crystal by the photoalignment method has been researched.

SUMMARY

The present invention provides a photoalignment agent improving an afterimage, a liquid crystal display including the same, and a manufacturing method thereof.

In exemplary embodiments, a photoalignment agent includes a copolymer of i) at least one of a cyclobutanedianhydride ("CBDA") and a CBDA derivative, and ii) a realignment property diamine, where the realignment property diamine includes two or more aromatic rings connected by an ester group.

The cyclobutanedianhydride is represented by Formula A, the cyclobutanedianhydride derivative is represented by Formula B, and the realignment property diamine is represented by Formula C.

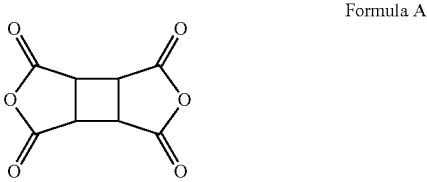

Formula A

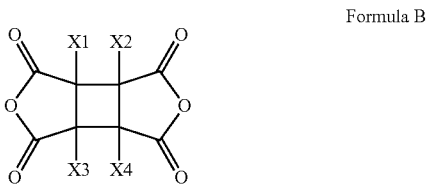

Formula B

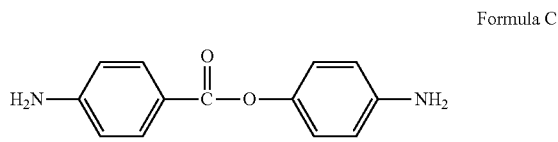

Formula C

In Formula (B), X1, X2, X3, and X4 are independently hydrogen, a halogen, or an alkyl group, and at least one of X1, X2, X3, and X4 is not hydrogen.

The copolymer includes at least one repeating unit represented by Formula D, Formula E, and Formula F.

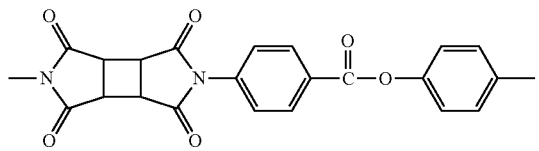

Formula D

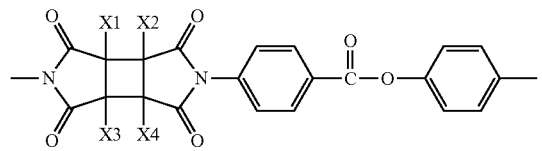

Formula E

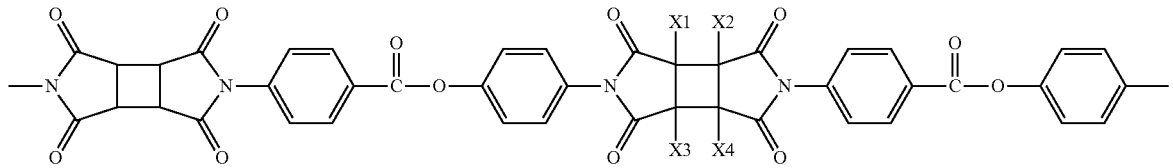

Formula F

In the above formulas, X1, X2, X3, and X4 are independently hydrogen, a halogen, or an alkyl group, and at least one of X1, X2, X3, and X4 is not hydrogen.

A realignment product of the copolymer includes at least one compound represented by Formula G and Formula H.

Formula G

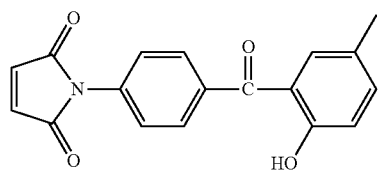

Formula H

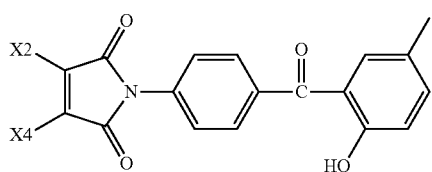

In Formula (H), X2 and X4 are independently hydrogen, a halogen, or an alkyl group.

Formula B

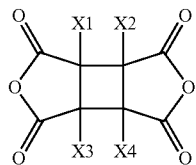

Formula C

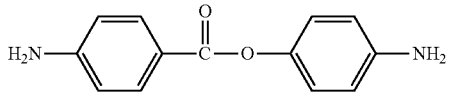

In Formula (B), X1, X2, X3, and X4 are independently hydrogen, a halogen, or an alkyl group, and at least one of X1, X2, X3, and X4 is not hydrogen.

The first alignment layer includes at least one repeating unit represented by Formula D, Formula E, and Formula F.

Formula D

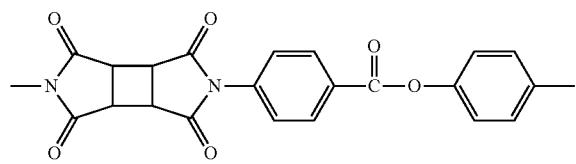

Formula E

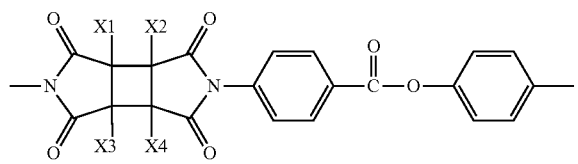

Formula F

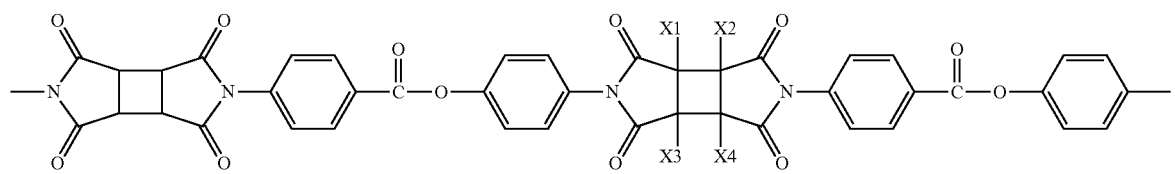

In exemplary embodiments, a liquid crystal display includes: a first substrate; a thin film transistor disposed on the first substrate; a first electrode connected to the thin film transistor; and a first alignment layer disposed on the first electrode, where the first alignment layer includes a copolymer of i) at least one of a cyclobutanedianhydride (CBDA) and a cyclobutanedianhydride (CBDA) derivative and ii) a realignment property diamine, where the realignment property diamine includes two or more aromatic rings connected by using an ester group.

The cyclobutanedianhydride (CBDA) is represented by Formula A, the cyclobutanedianhydride (CBDA) derivative is represented by Formula B, and ii) the realignment property diamine is represented by Formula C.

In the above formulas, X1, X2, X3, and X4 are independently hydrogen, a halogen, or an alkyl group, and at least one of X1, X2, X3, and X4 is not hydrogen.

The first alignment layer includes a realignment product of the copolymer including at least one compound represented by Formula G and Formula H.

Formula G

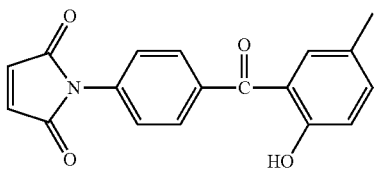

Formula H

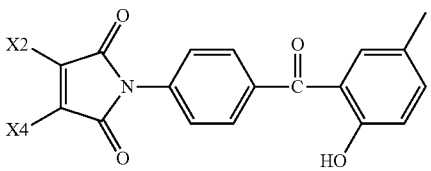

In Formula (H), X2 and X4 are independently hydrogen, a halogen, or an alkyl group.

The liquid crystal display further includes a second electrode disposed on the first substrate, and an insulating layer Formula A

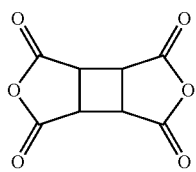

disposed between the first electrode and the second electrode, and the first electrode may include a plurality of branch electrodes, and the second electrode may have a planar shape.

A plurality of branch electrodes overlaps the second electrode having the planar shape.

The liquid crystal display further includes a passivation layer disposed between the thin film transistor and the second electrode, and the thin film transistor and the first electrode are connected by a contact hole defined in the passivation layer and the insulating layer.

The liquid crystal display further includes a second substrate facing the first substrate, a second alignment layer disposed on the second substrate, and a liquid crystal layer disposed between the first substrate and the second substrate, the liquid crystal layer including liquid crystal molecules, and the second alignment layer includes the same material as the first alignment layer.

In exemplary embodiments, a manufacturing method of a liquid crystal display includes: forming a thin film transistor on a first substrate; forming a passivation layer on the thin film transistor; forming a first electrode and a second electrode disposed to face each other via an insulating layer formed on the passivation layer; coating a photoalignment agent on the first electrode or the second electrode, where the photoalignment agent is a copolymer formed by polymerizing i) at least one of a cyclobutanedianhydride (CBDA) and a cyclobutanedianhydride (CBDA) derivative and ii) a realignment property diamine; baking the coated photoalignment agent; and irradiating the photoalignment agent with polarized light to form a first alignment layer, where the realignment property diamine includes two or more aromatic rings connected by an ester group.

The cyclobutanedianhydride (CBDA) is represented by Formula A, the cyclobutanedianhydride (CBDA) derivative is represented by Formula B, and ii) the realignment property diamine is represented by Formula C.

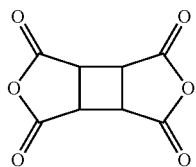

Formula A

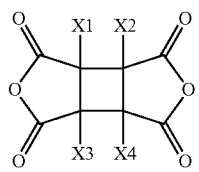

Formula B

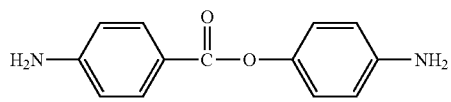

Formula C

In Formula (B), X1, X2, X3, and X4 are independently hydrogen, a halogen, or an alkyl group, and at least one of X1, X2, X3, and X4 is not hydrogen.

The copolymer includes at least one repeating unit represented by Formula D, Formula E, and Formula F.

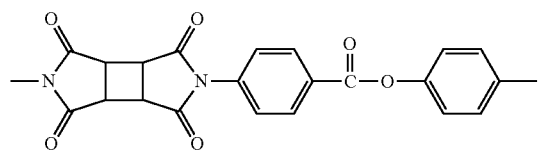

Formula D

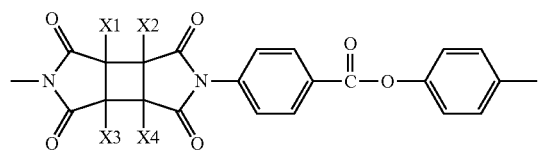

Formula E

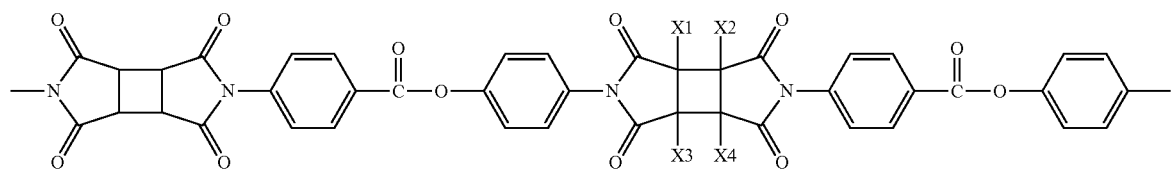

Formula F

In the above formulas, X1, X2, X3, and X4 are independently hydrogen, a halogen, or an alkyl group, and at least one of X1, X2, X3, and X4 is not hydrogen.

The method further includes: coating the photoalignment agent on a second substrate facing the first substrate; baking the coated photoalignment agent; and irradiating the photoalignment agent with polarized light to form a second alignment layer.

At least one of the first alignment layer and the second alignment layer include a realignment product of the copolymer including at least one compound represented by Formula G and Formula H after the irradiation with the polarized light.

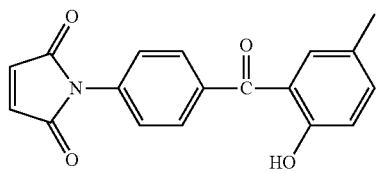

Formula G

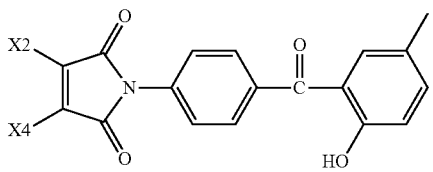

Formula H

Herein, X2 and X4 are independently hydrogen, a halogen, or an alkyl group).

The polarized light includes at least one of a 254 nanometer wavelength and a 313 nanometer wavelength.

The first electrode includes a plurality of branch electrodes, and the second electrode has a planar shape.

A plurality of branch electrodes overlaps the second electrode having the planar shape.

According to an exemplary embodiment of the present invention, the photoalignment agent, in which the CBDA or the CBDA derivative is polymerized with the realignment property diamine, is used to form the new photoalignment layer. The photoalignment layer may improve the afterimage.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
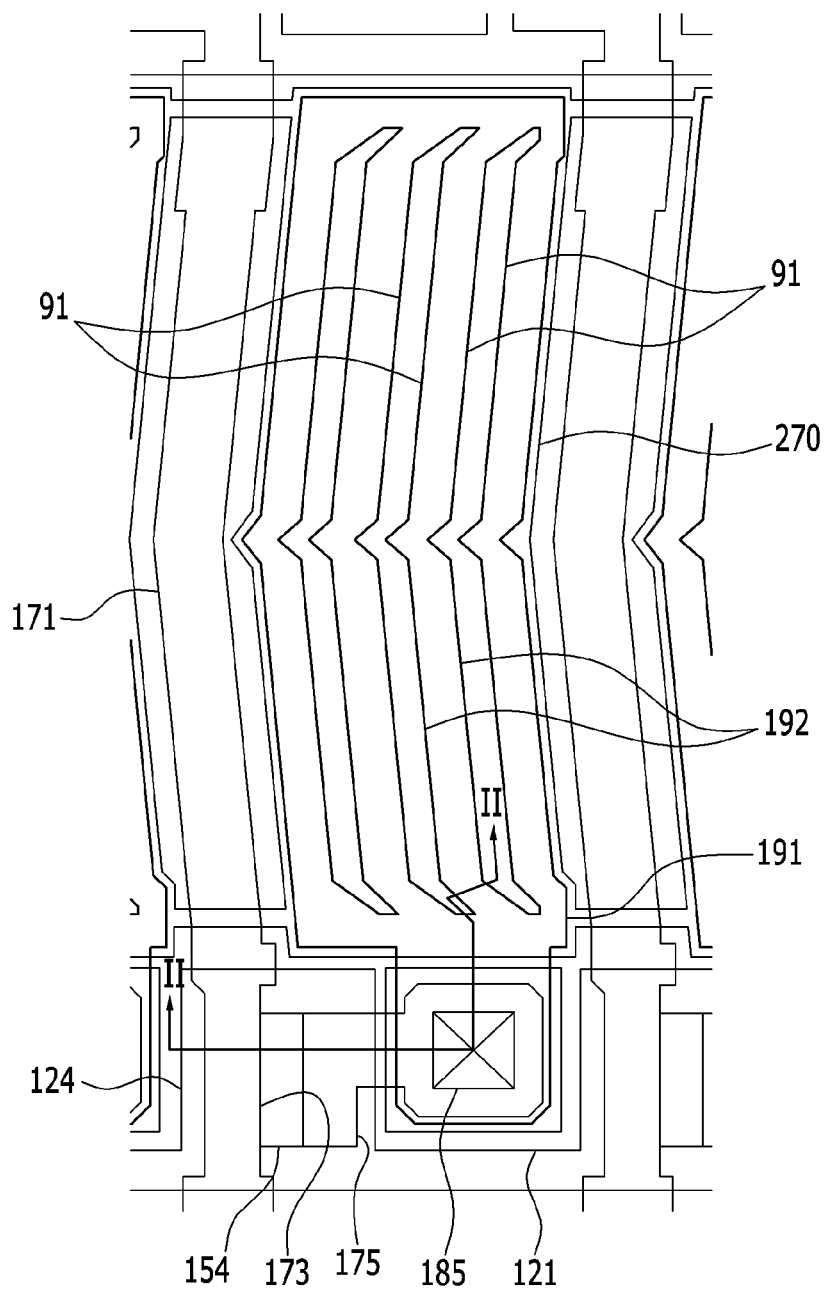
FIG. 1 is a top plan view of an exemplary embodiment of a liquid crystal display.

Hereinafter, exemplary embodiments of the present invention will be described in detail with reference to the accompanying drawings, in which various embodiments are shown. As those skilled in the art would realize, the described embodiments may be modified in various different ways, all without departing from the spirit or scope of the present invention. On the contrary, exemplary embodiments introduced herein are provided to make disclosed contents thorough and complete and sufficiently transfer the scope of the present invention to those skilled in the art.

In the drawings, the thickness of layers, films, panels, regions, etc., are exaggerated for clarity. It will be understood that when a layer is referred to as being "on" another layer or element, it can be directly on the other layer or element, or intervening elements may also be present therebetween. In contrast, when an element is referred to as being "directly on" another element, there are no intervening elements present. Like reference numerals designate like elements throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
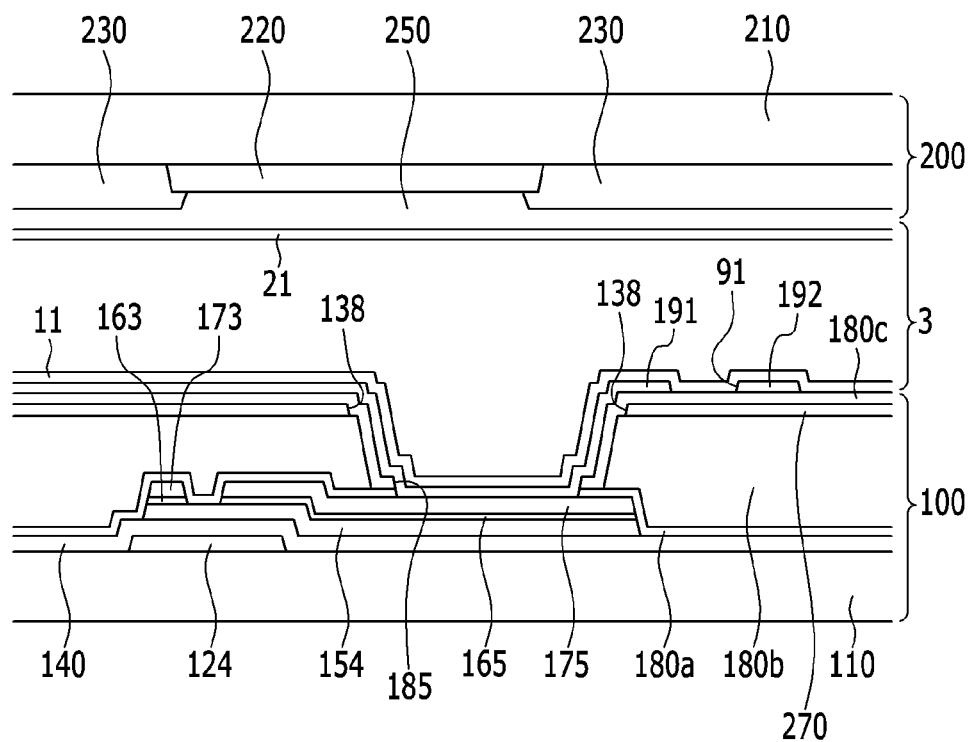
FIG. 2 is a cross-sectional view taken along a line II-II of FIG. 1.

FIG. 1 is a top plan view illustrating an exemplary embodiment of a liquid crystal display. FIG. 2 is a cross-sectional view taken along a line II-II of FIG. 1.

Referring to FIG. 1 and FIG. 2, the exemplary liquid crystal display includes a lower display panel 100 and an upper display panel 200 facing each other, and a liquid crystal layer 3 injected therebetween.

First, the lower display panel 100 will be described.

A gate conductor including a gate line 121 is formed on a first substrate 110 formed of transparent glass, plastics, or the like.

The gate line 121 includes a gate electrode 124, and a wide end portion (not shown) for connection with another layer or an external driving circuit. The gate line 121 may be made of an aluminum-based metal such as aluminum (Al) or an aluminum alloy, a silver-based metal such as silver (Ag) or an silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 formed of a silicon nitride (SiNx), a silicon oxide (SiOx), or the like is formed on the gate line 121. The gate insulating layer 140 may have a multilayered structure including at least two insulating layers having different physical properties.

A semiconductor layer 154 made of amorphous silicon, polysilicon, or the like, is disposed on the gate insulating layer 140. The semiconductor layer 154 may include an oxide semiconductor.

Ohmic contacts 163 and 165 are formed on the semiconductor layer 154. The ohmic contacts 163 and 165 may be made of a material such as n+ hydrogenated amorphous silicon with which an n-type impurity such as phosphorus is doped at a high concentration, or a silicide. The ohmic contacts 163 and 165 may form a pair to be disposed on the semiconductor layer 154. In the case where the semiconductor 154 is an oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

The data line 171 includes a wide end portion (not shown) for connection with another layer or an external driving circuit. The data line 171 transports a data signal and mainly extends in a vertical direction to cross the gate line 121.

In this case, the data line 171 may one or more bent portions having a bent shape in order to obtain maximum transmittance of the liquid crystal display, and the bent portions may meet each other in an intermediate region of a pixel region to form a V shape.

The source electrode 173 is a portion of the data line 171, and is disposed on the same line as the data line 171. The drain electrode 175 is formed to extend in parallel to the source electrode 173. Accordingly, the drain electrode 175 is parallel to a portion of the data line 171.

The gate electrode 124, the source electrode 173, and the drain electrode 175 form one thin film transistor ("TFT") together with the semiconductor layer 154, and a channel of the thin film transistor is formed in a portion of the semiconductor layer 154 between the source electrode 173 and the drain electrode 175.

The exemplary liquid crystal display may include the source electrode 173 disposed on the same line as the data line 171 with the drain electrode 175 extending in parallel to the data line 171 in order to increase a width of the thin film transistor without increasing the occupying area of the data conductor, and thus an aperture ratio of the liquid crystal display may be increased.

It is preferable that the data line 171 and the drain electrode 175 be made of a refractory metal such as molybdenum, chromium, tantalum, and titanium, or an alloy thereof, and the data line 171 and the drain electrode 175 may have a multilayered structure (not shown) including a refractory metal layer and a low resistance conductive layer. Examples of the multilayered structure may include a double layer of a chromium or molybdenum (alloy) lower layer and an aluminum (alloy) upper layer, and a triple layer of a molybdenum (alloy) lower layer, an aluminum (alloy) intermediate layer, and a molybdenum (alloy) upper layer.

A first passivation layer 180a is disposed on exposed portions of the data conductors 171, 173, and 175, the gate insulating layer 140, and the semiconductor layer 154. The first passivation layer 180a may be formed of an organic insulating material, an inorganic insulating material, or the like.

A second passivation layer 180b is formed on the first passivation layer 180a. The second passivation layer 180b may be formed of an organic insulator.

The second passivation layer 180b may be a color filter. In the case where the second passivation layer 180b is the color filter, the second passivation layer 180b may intrinsically display any one of the primary colors. Examples of the primary colors may include three primary colors such as red, green, and blue, yellow, cyan, and magenta, or the like. Although not shown in the drawings, the color filter may further include a color filter displaying a mixed color of the primary colors or white in addition to the primary colors. In the case where the second passivation layer 180b is the color filter, a color filter 230 may be omitted in the upper display panel 200 as will be described later. Differently from the present exemplary embodiment, the second passivation layer 180b may be formed of an organic insulating material, and the color filter (not shown) may be formed between the first passivation layer 180a and the second passivation layer 180b.

A common electrode 270 is disposed on the second passivation layer 180b. The common electrode 270 may have a planar shape, may be formed of an integrated plate on an entire surface of the substrate 110, and has an opening 138 disposed in a region corresponding to a periphery of the drain electrode 175. That is, the common electrode 270 may have a plate shape.

Common electrodes 270 disposed in adjacent pixels may be connected to each other to receive a common voltage having a predetermined size supplied from outside of a display region.

An insulating layer 180c is disposed on the common electrode 270. The insulating layer 180c may be formed of an organic insulating material, an inorganic insulating material, or the like.

A pixel electrode 191 is disposed on the insulating layer 180c. The pixel electrode 191 includes a curved edge that is almost parallel to a first bent portion and a second bent portion of the data line 171. The pixel electrode 191 has a plurality of cutouts 91, and includes a plurality of branch electrodes 192 disposed between the adjacent cutouts 91.

The pixel electrode 191 is a first field generating electrode or a first electrode, and the common electrode 270 is a second field generating electrode or a second electrode. The pixel electrode 191 and the common electrode 270 may form a fringe field.

A first contact hole 185 is defined in the first passivation layer 180*a*, the second passivation layer 180*b*, and the insulating layer 180*c*, and exposes the drain electrode. The pixel electrode 191 is physically and electrically connected to the drain electrode 175 through the contact hole 185 to receive a voltage from the drain electrode 175.

A first alignment layer 11 is formed on the pixel electrode 191 and the insulating layer 180*c*. The first alignment layer 11 includes a photoalignment layer.

Hereafter, exemplary embodiments of the photoalignment agent will be described. The photoalignment layer is formed by using the exemplary photoalignment agent.

In an exemplary embodiment, the photoalignment agent includes a copolymer of i) at least one of cyclobutanedianhydride (CBDA) and a cyclobutanedianhydride (CBDA) derivative, and ii) a realignment property diamine. In the realignment property diamine, two or more aromatic rings are connected by an ester group as a connection ring.

In the present exemplary embodiment, a diamine without a realignment property may be further included in addition to the realignment property diamine. The diamine may be a compound represented by Formula N.

Formula N

The diamine may be an aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl) methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl) anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl) hexafluoropropane, and 2,2-bis[4-(4-aminophenoxy)phenyl] hexafluoropropane, a cycloaliphatic diamine such as bis(4-aminocyclohexyl)methane and bis(4-amino-3-methylcyclohexyl)methane, or an aliphatic diamine such as tetramethylenediamine and hexamethylenediamine. However, the diamine is not particularly limited thereto.

In an exemplary embodiment, the copolymer may be formed by polymerizing i) at least one of the cyclobutanedianhydride (CBDA) represented by Formula A and the cyclobutanedianhydride (CBDA) represented by Formula B, and ii) the realignment property diamine represented by Formula C.

Formula A

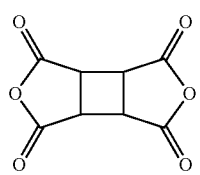

Formula B

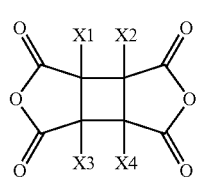

Formula C

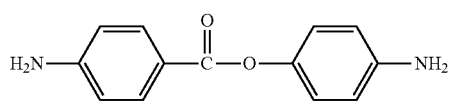

In Formula (B), X1, X2, X3, and X4 are independently hydrogen, a halogen, or an organic compound, and at least one of X1, X2, X3, and X4 is not hydrogen. The organic compound may include an alkyl group or alkoxyl group with a carbon number of 1 to 6. However, the organic compound is not particularly limited thereto.

The exemplary copolymer may include at least one repeating unit represented by Formula D, Formula E, and Formula F.

Formula D

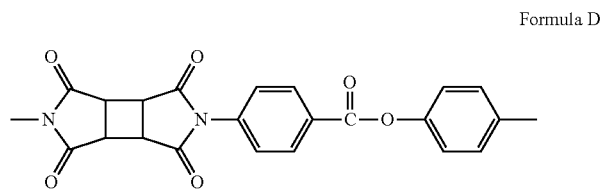

Formula E

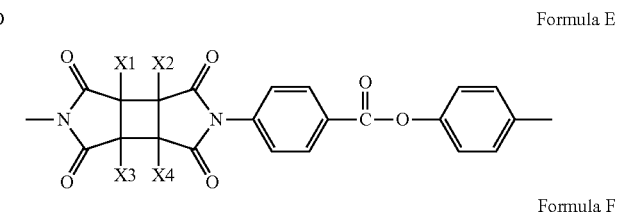

Formula F

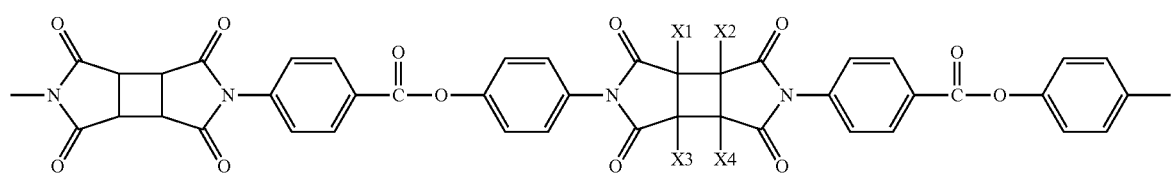

In Formula E and Formula F, X1, X2, X3, and X4 are hydrogen, a halogen, or an organic compound, and at least one of X1, X2, X3, and X4 is not hydrogen. The organic compound may include an alkyl group or alkoxyl group with a carbon number of 1 to 6. However, the organic compound is not particularly limited thereto.

In an exemplary embodiment, if polarized light is irradiated on the copolymer, the copolymer may be realigned to a compound represented by at least one of Formula G and Formula H. The realignment direction may be substantially perpendicular to the polarization direction.

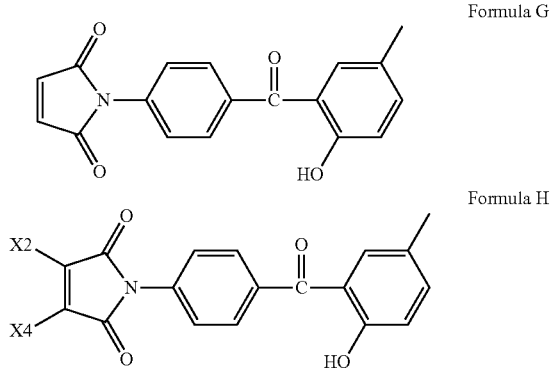

In Formula (H), X2 and X4 are independently hydrogen, a halogen, or an alkyl group.

The first alignment layer 11 is formed using the photoalignment agent.

In an exemplary embodiment, the first alignment layer 11 may include a realignment product of the copolymer comprising at least one compound represented by Formula G and Formula H following irradiation with polarized light. The realignment direction may be substantially perpendicular to the polarization direction

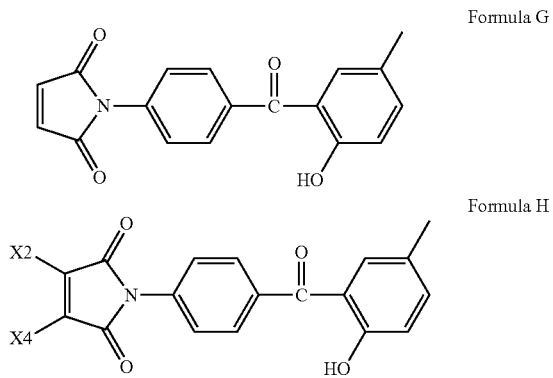

In Formula (H), X2 and X4 are independently hydrogen, a halogen, or an alkyl group.

Now, a method of forming the photoalignment layer will be described.

The photoalignment agent may be a copolymer formed by polymerizing i) at least one of the cyclobutanedianhydride (CBDA) and the cyclobutanedianhydride (CBDA) derivative, and ii) the realignment property diamine, is coated on the pixel electrode 191.

The exemplary photoalignment agent is a material forming the first alignment layer 11.

Next, the coated photoalignment agent is baked. The baking may be performed through two steps of a pre-bake and a hard bake.

Polarized light is then irradiated onto the photoalignment agent to form the first alignment layer 11. The irradiated light may be ultraviolet ("UV") light having a wavelength of more than 240 nanometers (nm) to less than 380 nanometers. Specifically, ultraviolet (UV) light including at least one of a 254 nanometer wavelength and a 313 nanometer wavelength may be used.

Figure 3:
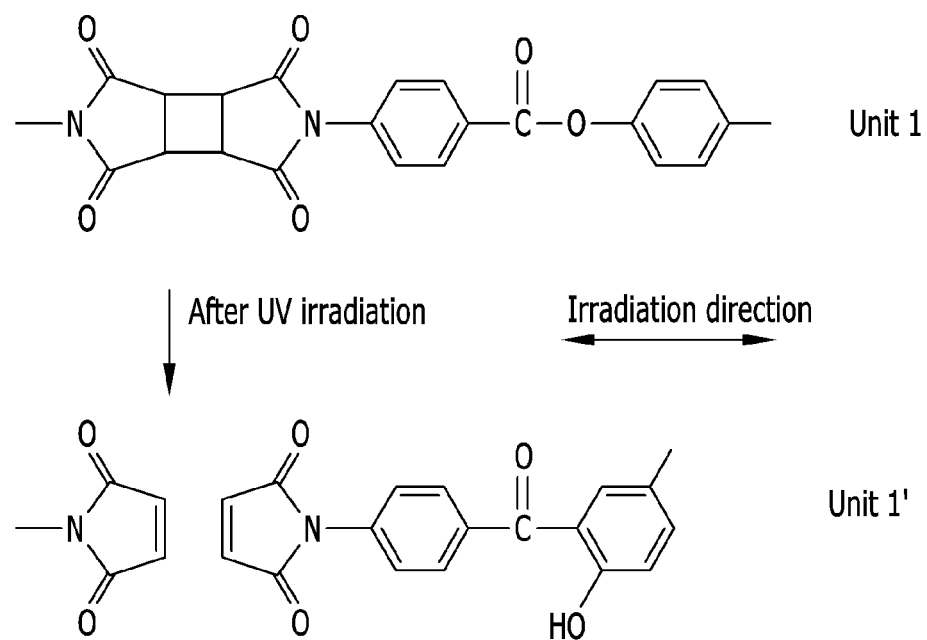
FIG. 3 is a structure-based formula showing the decomposition and realignment of polyimide in an exemplary photoalignment agent.

As shown in FIG. 3, when UV light is irradiated on the photoalignment agent, the portion of the copolymer corresponding to the CBDA (or CBDA derivative) is decomposed in the polarization direction. In addition, the portion of the copolymer corresponding to the diamine is realigned to be arranged in the direction substantially perpendicular to the polarization direction. As described above, the exemplary photoalignment layer includes the copolymer of i) at least one of the CBDA and the CBDA derivative, and ii) the realignment property diamine, such that the afterimage and sensitivity of the liquid crystal display may be improved.

Following irradiation, the first alignment layer 11 may be baked once more in order to increase the alignment properties of the alignment layer 11.

Figure 4:
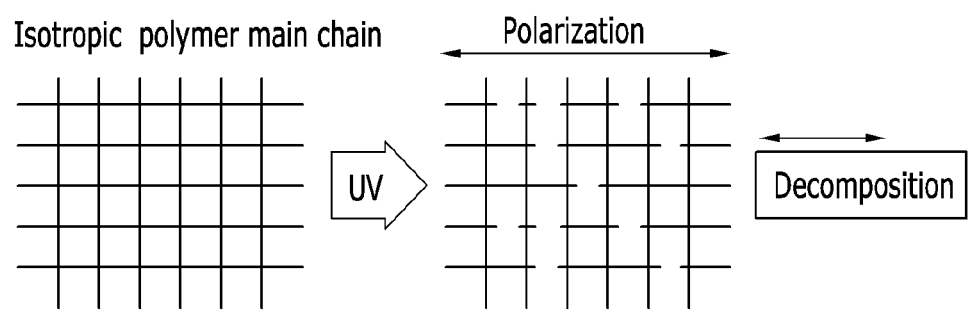
FIG. 4 is a view illustrating a change from isotropy to anisotropy in the exemplary alignment layer.

FIG. 3 is a structure-based formula illustrating the decomposition of the polyimide in the exemplary alignment layer. FIG. 4 is a view illustrating a change process from isotropy to anisotropy in the exemplary alignment layer.

Referring to FIG. 3, cyclobutanedianhydride (CBDA) and the realignment property diamine are subjected to the polymerization reaction through a baking process to form a polyimide (Unit 1), and UV light is irradiated on the polyimide to form a maleimide (Unit 1').

FIG. 4 illustrates that a polymer main chain including the polyimide (unit 1) illustrated in FIG. 3 is decomposed to be aligned as the result of the irradiation with polarized UV light. Referring to FIG. 4, if polarized UV light is irradiated on an isotropic polymer main chain, photodecomposition occurs in a polarization direction (e.g. absorption axis direction), and thus a photoalignment layer may be aligned in a direction that is perpendicular to polarization. If an exposure amount is excessively small, the decomposition efficiency is low, and the alignment property may deteriorate. On the contrary, if the exposure amount is excessively increased, the decomposition efficiency is increased, and decomposition occurs in another direction in addition to the polarization direction, and thus the alignment property may deteriorate.

Now, referring back to FIG. 1 and FIG. 2, the upper display panel 200 will be described.

A light blocking member 220 is formed on a second substrate 210 made of transparent glass, plastics, or the like. The light blocking member 220 is called a black matrix and prevents light leakage.

Further, a plurality of color filters 230 are also formed on the second substrate 210. In the case where the second passivation layer 180b of the lower display panel 100 is the color filter, the color filter 230 of the upper display panel 200 may be omitted. The light blocking member 220 of the upper display panel 200 may be formed in the lower display panel 100.

An overcoat 250 is formed on the color filter(s) 230 and the light blocking member 220. The overcoat 250 may be made of an (organic) insulator, and prevents exposure of the color filter 230 and provides a flat surface. The overcoat 250 may be omitted.

A second alignment layer 21 is formed on the overcoat 250. The second alignment layer 21 includes a photoreactive material. The second alignment layer 21 may be formed of the same material as the first alignment layer 11 by the same method as described above for the first alignment layer 11.

In an exemplary embodiment, the liquid crystal layer 3 may include a liquid crystal material having dielectric anisotropy.

Liquid crystal molecules of the liquid crystal layer 3 are arranged so that a longitudinal axis direction thereof is parallel or perpendicular to the display panels 100 and 200.

The pixel electrode 191 receives a data voltage from the drain electrode 175, and the common electrode 270 receives a common voltage of a predetermined size from a common voltage applying unit disposed outside of the display region.

The pixel electrode 191 and the common electrode 270 act as field generating electrodes. The liquid crystal molecules of the liquid crystal layer 3 disposed on the pixel electrode 191 and the common electrode 270 are rotated in a direction that is perpendicular to the direction of the electric field generated by the pixel electrode 191 and the common electrode 270. The polarization of light passing through the liquid crystal layer is changed according to the determined rotation direction of the liquid crystal molecules.

In this way, transmittance of the liquid crystal display may be increased and a wide viewing angle may be implemented by forming the two field generating electrodes 191 and 270 on one display panel 100.

In an exemplary embodiment of the liquid crystal display, the common electrode 270 has a planar shape and the pixel electrode 191 has a plurality of branch electrodes. In another exemplary embodiment of the liquid crystal display, the pixel electrode 191 may have the planar shape and the common electrode 270 may have the plurality of branch electrodes.

The present invention can be applied to all other cases where two field generating electrodes overlap each other on the first substrate 110 while the insulating layer is interposed therebetween, the first field generating electrode formed beneath the insulating layer has a planar shape, and the second field generating electrode formed on the insulating layer has the plurality of branch electrodes.

Figure 5:
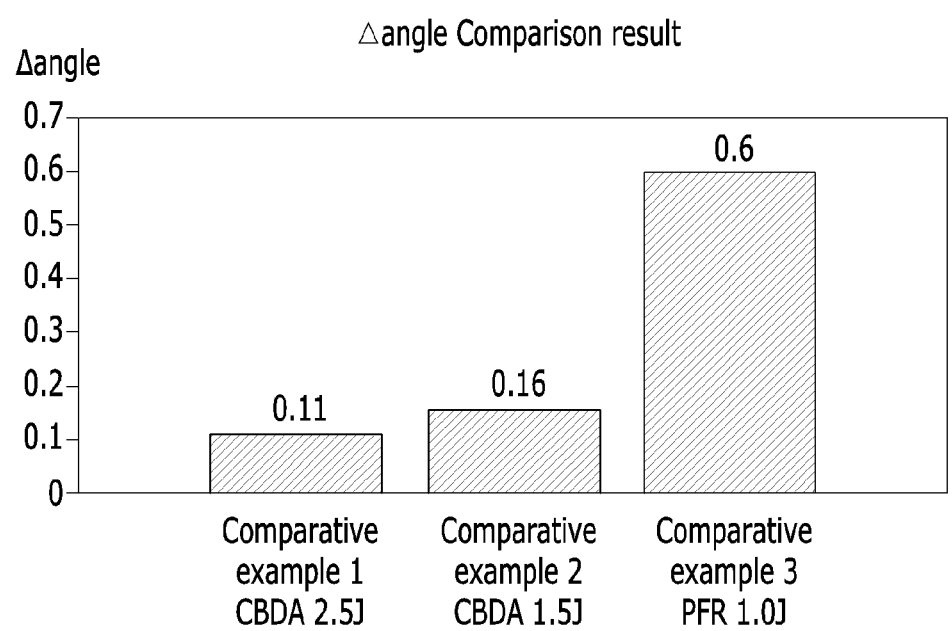
FIG. 5 is a graph showing the change in angle as a measure of the afterimage versus the type of photoalignment agent and exposure energy used.

FIG. 5 is a graph showing the afterimage (measured by the angle change ("AC")) according to the type of photoalignment agent and exposure energy used. For Comparative Example 1 a CBDA polymer is formed that does not include the realignment property diamine and an AC afterimage was measured under a UV exposure of 2.5 Joules (J). In Comparative Example 2, a CBDA polymer was formed without the realignment property diamine and the AC afterimage was measured under a UV exposure of 1.5 J. In Comparative Example 3, the polymer is made of only the realignment property diamine without the CBDA and the AC afterimage is measured under a UV exposure of 1.0 J. The angle change (Δ angle) represents a difference between an azimuth angle of the liquid crystal in the afterimage and an initial azimuth angle of the liquid crystal.

Referring to FIG. 5, the afterimage of Comparative Example 3 is deteriorated about six fold as compared with Comparative Example 1 and Comparative Example 2. In other words, when forming the photoalignment layer using only the realignment property diamine, the alignment characteristic may be increased, however the afterimage may be serious. In the cases of Comparative Example 1 and Comparative Example 2, forming the photoalignment layer using only the CBDA polymer, it is difficult to increase the exposure energy when considering productivity. Accordingly, the sensitivity is low such that the decomposition ratio is decreased, and thereby the alignment characteristic is also deteriorated.

However, when forming the photoalignment layer by using the exemplary photoalignment agent, the exposure amount may be decreased, and although the sensitivity is decreased according to the decreasing exposure amount, the sensitivity and the alignment characteristics may be improved by the realignment property material.

Figure 6:
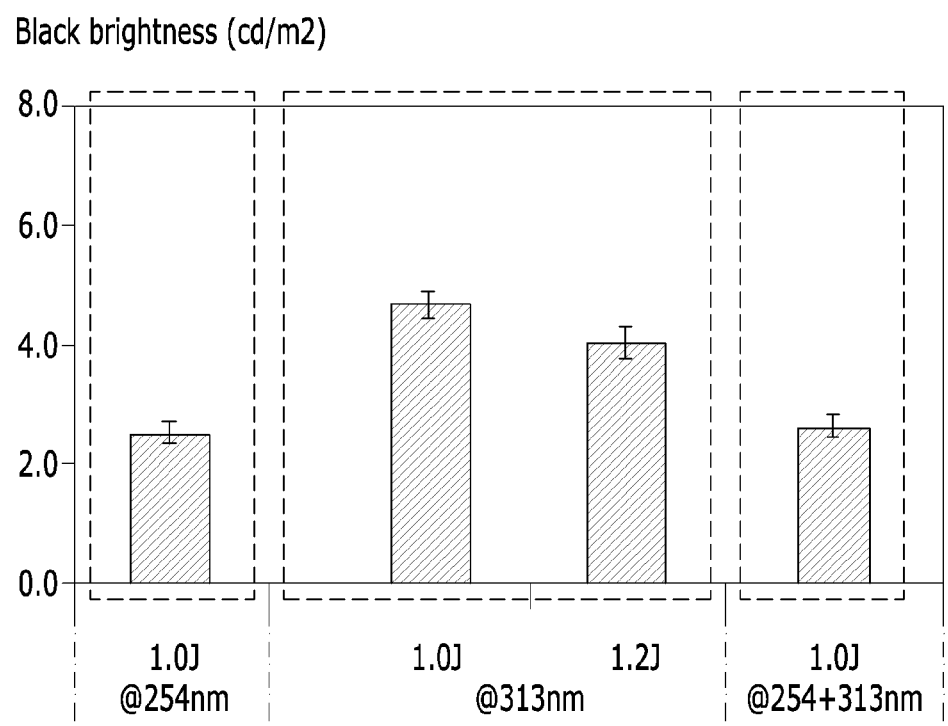
FIG. 6 is a graph showing the black luminance in candela per square meter ($cd/m^2$)) versus the irradiation wavelength for a liquid crystal display including a photoalignment layer formed of an exemplary photoalignment agent.

FIG. 6 is a graph showing a black luminance according to an exposure wavelength of a liquid crystal display including a photoalignment layer formed of the exemplary photo alignment agent.

In the case of the conventional photoalignment layer formed of the CBDA polymer without the realignment property diamine, black luminance of 8 candela per square meter (cd/m2) appears at the 1.5 J exposure. However, referring to FIG. 6, in the case of the photoalignment layer formed of the exemplary photoalignment agent, although the sensitivity was decreased less than 1.5 J to improve the productivity, the black luminance appeared at less than 5 cd/m². Accordingly, the effect of the afterimage improvement was obtained. Also, when the exposure conditions included the 313 nm wavelength as well as the short wavelength of 254 nm, the low black luminance of less than 3 cd/m² was obtained such that the exposure wavelength range was widened to the 313 nm wavelength as compared with the 254 nm wavelength.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A photoalignment agent comprising,
a realignment product of a copolymer of i) at least one of a cyclobutanedianhydride and a cyclobutanedianhydride (CBDA) derivative, and ii) a realignment property diamine,
wherein the realignment property diamine comprises two or more aromatic rings connected by an ester group,
wherein the realignment product of the copolymer comprises at least one compound represented by Formula G and Formula H:

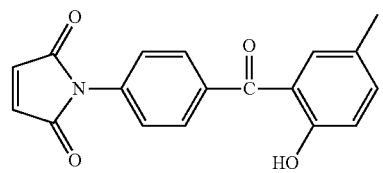

Formula G

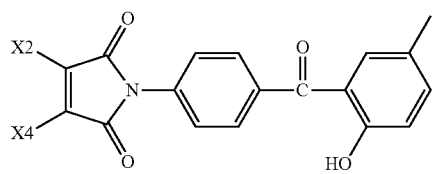

Formula H wherein X2 and X4 are independently hydrogen, a halogen, or an alkyl group.

2. The photoalignment agent of claim 1, wherein
the cyclobutanedianhydride is represented by Formula A, the cyclobutanedianhydride derivative is represented by Formula B, and
the realignment property diamine is represented by Formula C:

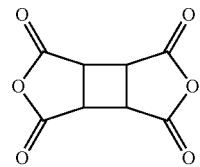

Formula A

-continued

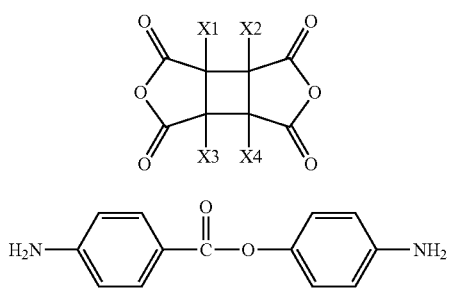
Formula B

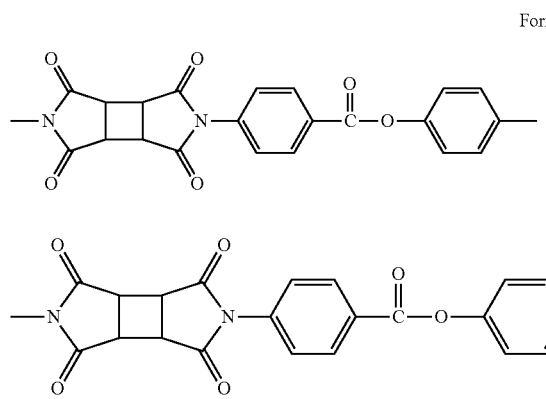
Formula C wherein X1, X2, X3, and X4 are independently hydrogen, a halogen, or an alkyl group, and at least one of X1, X2, X3, and X4 is not hydrogen.

3. The photoalignment agent of claim 2, wherein the copolymer comprises at least one repeating unit represented by Formula D, Formula E, and Formula F:

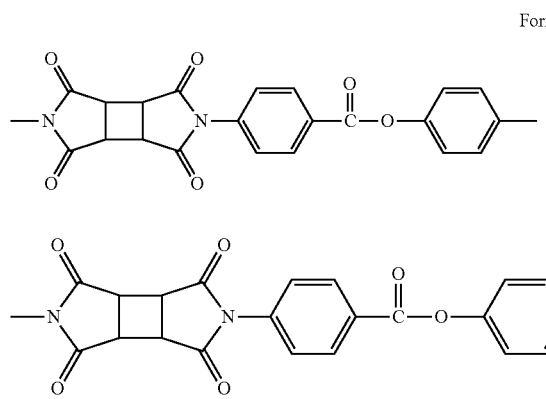

wherein X1, X2, X3, and X4 are independently hydrogen, a halogen, or an alkyl group, and at least one of X1, X2, X3, and X4 is not hydrogen.

4. A liquid crystal display comprising:
a first substrate;
a thin film transistor disposed on the first substrate;
a first electrode connected to the thin film transistor; and
a first alignment layer disposed on the first electrode,
wherein the first alignment layer comprises a realignment product of copolymer of i) at least one of a cyclobutanedianhydride and a cyclobutanedianhydride derivative, and ii) a realignment property diamine, and
wherein the realignment property diamine comprises two or more aromatic rings connected by using an ester group,
wherein the realignment product of the copolymer comprises at least one compound represented by Formula G and Formula H:

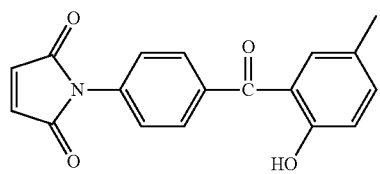
Formula G

-continued

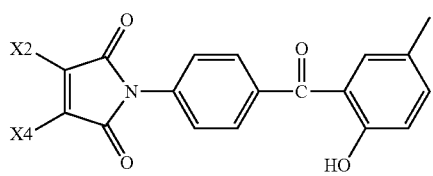
Formula H wherein X2 and X4 are independently hydrogen, a halogen, or an alkyl group.

5. The liquid crystal display of claim 4, wherein
the cyclobutanedianhydride is represented by Formula A,
the cyclobutanedianhydride derivative is represented by Formula B, and
the realignment property diamine is represented by Formula C:

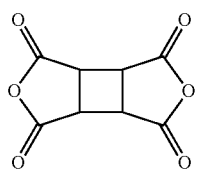
Formula A

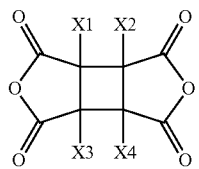
Formula B

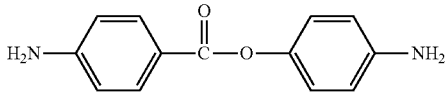
Formula C wherein X1, X2, X3, and X4 are independently hydrogen, a halogen, or an alkyl group, and at least one of X1, X2, X3, and X4 is not hydrogen.

6. The liquid crystal display of claim 5, wherein
the first alignment layer comprises at least one repeating unit represented by Formula D, Formula E, and Formula F:

Formula D

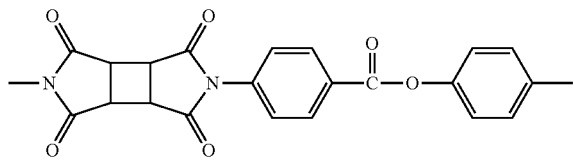

Formula E

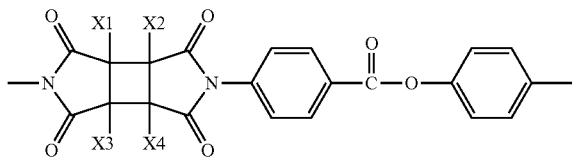

Formula F

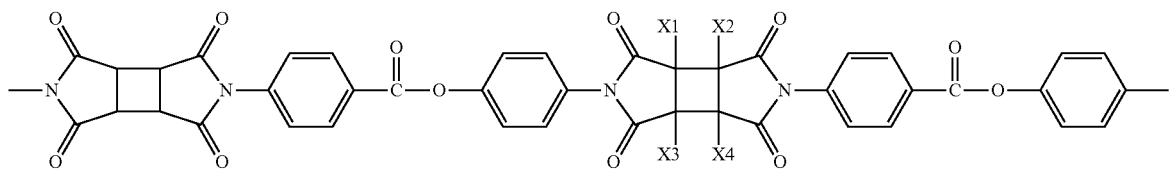

wherein X1, X2, X3, and X4 are independently hydrogen, a halogen, or an alkyl group, and at least one of X1, X2, X3, and X4 is not hydrogen.

7. The liquid crystal display of claim 4, further comprising a second electrode disposed on the first substrate, and an insulating layer disposed between the first electrode and the second electrode, wherein the first electrode includes a plurality of branch electrodes, and the second electrode has a planar shape.

8. The liquid crystal display of claim 7, wherein the plurality of branch electrodes overlaps the second electrode having the planar shape.

9. The liquid crystal display of claim 8, further comprising a passivation layer disposed between the thin film transistor and the second electrode, wherein the thin film transistor and the first electrode are connected by a contact hole defined in the passivation layer and the insulating layer.

10. The liquid crystal display of claim 9, further comprising:
a second substrate facing the first substrate;
a second alignment layer disposed on the second substrate; and
a liquid crystal layer disposed between the first substrate and the second substrate wherein the liquid crystal layer comprises liquid crystal molecules,
wherein the second alignment layer comprises the same material as the first alignment layer.

11. A method of manufacturing a liquid crystal display comprising:
forming a thin film transistor on a first substrate;
forming a passivation layer on the thin film transistor;
forming a first electrode and a second electrode disposed to face each other via an insulating layer formed on the passivation layer;
coating a photoalignment agent on the first electrode or the second electrode, wherein the photoalignment agent is a copolymer formed by polymerizing i) at least one of a cyclobutanedianhydride and a cyclobutanedianhydride derivative, and ii) a realignment property diamine;
baking the coated photoalignment agent; and
irradiating the photoalignment agent with polarized light to form a first alignment layer comprising a realignment product of the copolymer,
wherein the realignment property diamine comprises two or more aromatic rings connected by an ester group,
wherein the realignment product of the copolymer comprises at least one compound represented by Formula G and Formula H:

Formula G

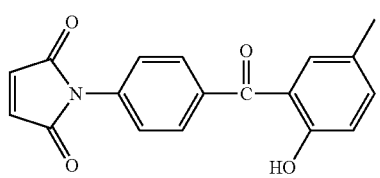

Formula H

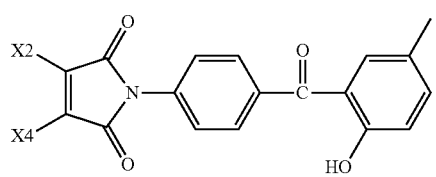

wherein X2 and X4 are independently hydrogen, a halogen, or an alkyl group.

12. The method of claim 11, wherein
the cyclobutanedianhydride is represented by Formula A,
the cyclobutanedianhydride derivative is represented by Formula B, and
the realignment property diamine is represented by Formula C:

Formula A

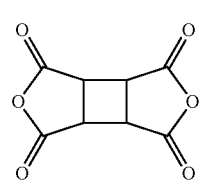

Formula B

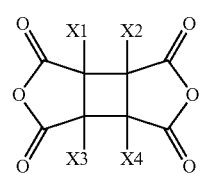

Formula C

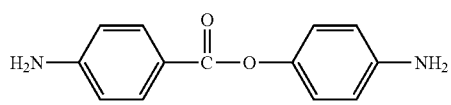

wherein X1, X2, X3, and X4 are independently hydrogen, a halogen, or an alkyl group, and at least one of X1, X2, X3, and X4 is not hydrogen.

13. The method of claim 12, wherein
the copolymer comprises at least one repeating unit represented by Formula D, Formula E, and Formula F:

Formula D
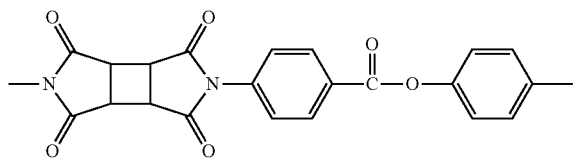

Formula E
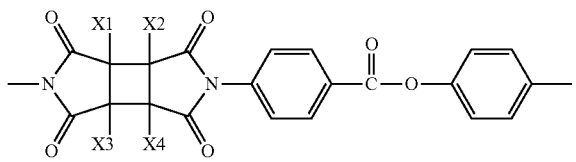

Formula F
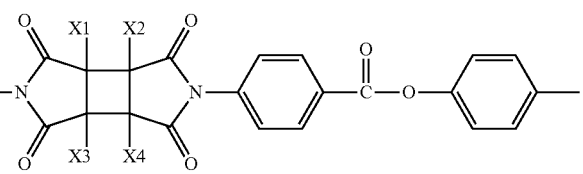

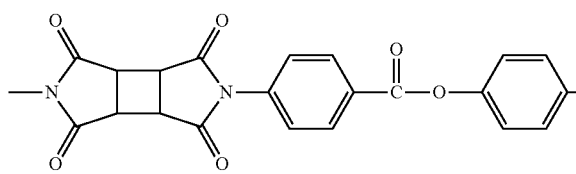

wherein X1, X2, X3, and X4 are independently hydrogen, a halogen, or an alkyl group, and at least one of X1, X2, X3, and X4 is not hydrogen).

14. The method of claim 13, further comprising:

coating the photoalignment agent on a second substrate facing the first substrate;

baking the photoalignment agent coated on the second substrate; and irradiating the photoalignment agent coated on the second substrate with polarized light to form a second alignment layer on the second substrate, and comprising a realignment product of the copolymer.

15. The method of claim 11, wherein
the polarized light comprises at least one of a 254 nanometer wavelength and a 313 nanometer wavelength.

16. The method of claim 11, wherein
the first electrode comprises a plurality of branch electrodes, and the second electrode has a planar shape.

17. The method of claim 16, wherein
the plurality of branch electrodes overlap the second electrode having the planar shape.

18. The photoalignment agent of claim 1, wherein
the realignment product of the copolymer comprises a maleimide.

* * * * *